(12) United States Patent
Ou

(10) Patent No.: US 6,443,774 B1
(45) Date of Patent: Sep. 3, 2002

(54) EXTENDING CIGAR-LIGHTING SEAT

(76) Inventor: Jack Ou, 3Fl., No. 12, Lane 47, Fu-Kang St., Nan-Kang District, Taipei City (TW)

(*) Notice: Subject to any disclaimer, the term of this patent is extended or adjusted under 35 U.S.C. 154(b) by 0 days.

(21) Appl. No.: 09/872,813

(22) Filed: Jun. 4, 2001

(51) Int. Cl.[7] .............................................. H01R 24/04
(52) U.S. Cl. ........................................................ 439/668
(58) Field of Search ......................................... 439/668

(56) References Cited

U.S. PATENT DOCUMENTS 5,414,770 A * 5/1995 Wang ........................... 379/446
6,138,041 A * 10/2000 Yahia ........................... 455/569

* cited by examiner

*Primary Examiner*—Gary F. Paumen
*Assistant Examiner*—Ann McCamey
(74) *Attorney, Agent, or Firm*—Raymond Y. Chan; David and Raymond Patent Group

(57) ABSTRACT

An extending cigar-lighting seat is constructed to be inserted into a car cigar-lighting socket. The extending cigar-lighting seat includes at least an inserting member, a first extending member, a second extending member and a universal connector. Each extending member can be connected to another portion, wherein the distal of the extending member can be connected with various products, such as power extending connectors, air pumps, and hand-free receivers of handsets. The universal connector serves to adjust the connecting object upwards, downwards, rightwards, or leftwards. The number of extending member may be increased to larger than two as desired.

10 Claims, 6 Drawing Sheets

EXTENDING CIGAR-LIGHTING SEAT

FIELD OF THE INVENTION

The present invention relates to an extending cigar-lighting seat, and more particularly to an extending cigar-lighting seat which can extend the components of a car to a proper position inside the car so that the driver and passengers may operate it conveniently. Moreover, the present invention has a beautiful outlook appearance and is practical in construction.

BACKGROUND OF THE INVENTION

In general, the space within a car is limited. Therefore, how to utilize a limited space to arrange object is a major problem desired to be solved. For example, due to interior structure of a car, in general, only small joints can be plugged into the cigar-lighting socket. Moreover, the driver is often hindered by the control rods or other operation parts that may obstruct the driver to use the cigar-lighting socket.

Practically, the cigar-lighting socket can be functioned as a power. For example, used in the hand-free receiver of a mobile phone. In general, a mobile phone is carried in a pocket. However, it is often that the driver receives a call while he (or she) is driving. This is very dangerous and many car accidents occur due to this reason.

A prior art device is designed, which is installed in front of the cigar-lighter socket of a car or the storage space in the cigar-lighting seat for placing the mobile phone or beverages. However, it is not convenient that, for example, the viewing of the liquid crystal display of a mobile phone is small. Moreover, the effect is not good as it is viewed from lateral side while the messages on the screen of a mobile phone may be viewed for more than seconds, that may cause accidents.

SUMMARY OF THE PRESENT INVENTION

Accordingly, the primary object of the present invention is to provide an extending cigar-lighting seat which is positioned in a preferred position so that the user may use it conveniently.

Another object of the present invention is to provide an extending cigar-lighting seat, wherein by a universal connector, the object inserted into the extending cigar-lighting seat can be adjusted to a proper position.

A further object of the present invention is to provide an extending cigar-lighting seat, wherein a front end of the second extending portion can be incorporated with various consuming products so that the space is saved and an object of multi-functions is achieved.

A yet object of the present invention is to provide an extending cigar-lighting seat, wherein each extending portion is connected through a universal connector, so that it may be rotated easily. Furthermore, a stud serves to adjust the tightness thereof.

The other object of the present invention is to provide an extending cigar-lighting seat, wherein two power supplies are provided, so that many products or at least two electronic products can be used simultaneously.

To achieve above objects, the present invention provides an extending cigar-lighting seat comprising an inserting portion, a first extending portion, a second extending portion, and a universal connector. The inserting portion is inserted into a car cigar-lighting socket. A first extending portion is behind the inserting portion. The first extending portion is vertical to the inserting portion and is connected to the second extending portion. A universal connector serves to connect the first extending portion with the second extending portion. The second extending portion may move up, down, right or left so that the second extending portion moves up, down, right or left. The driver and passengers may use it effectively.

The various objects and advantages of the present invention will be more readily understood from the following detailed description when read in conjunction with the appended drawing.

DETAILED DESCRIPTION OF THE PREFERRED EMBODIMENT

In order that those skilled in the art can further understand the present invention, a detailed description is described as follows. However, these descriptions and thee appended drawings are only used to enable those skilled in the art to understand the objects, features, and characteristics of the present invention, but not used to confine the scope and spirit of the present invention defined in the appended claims.

Figure 1:
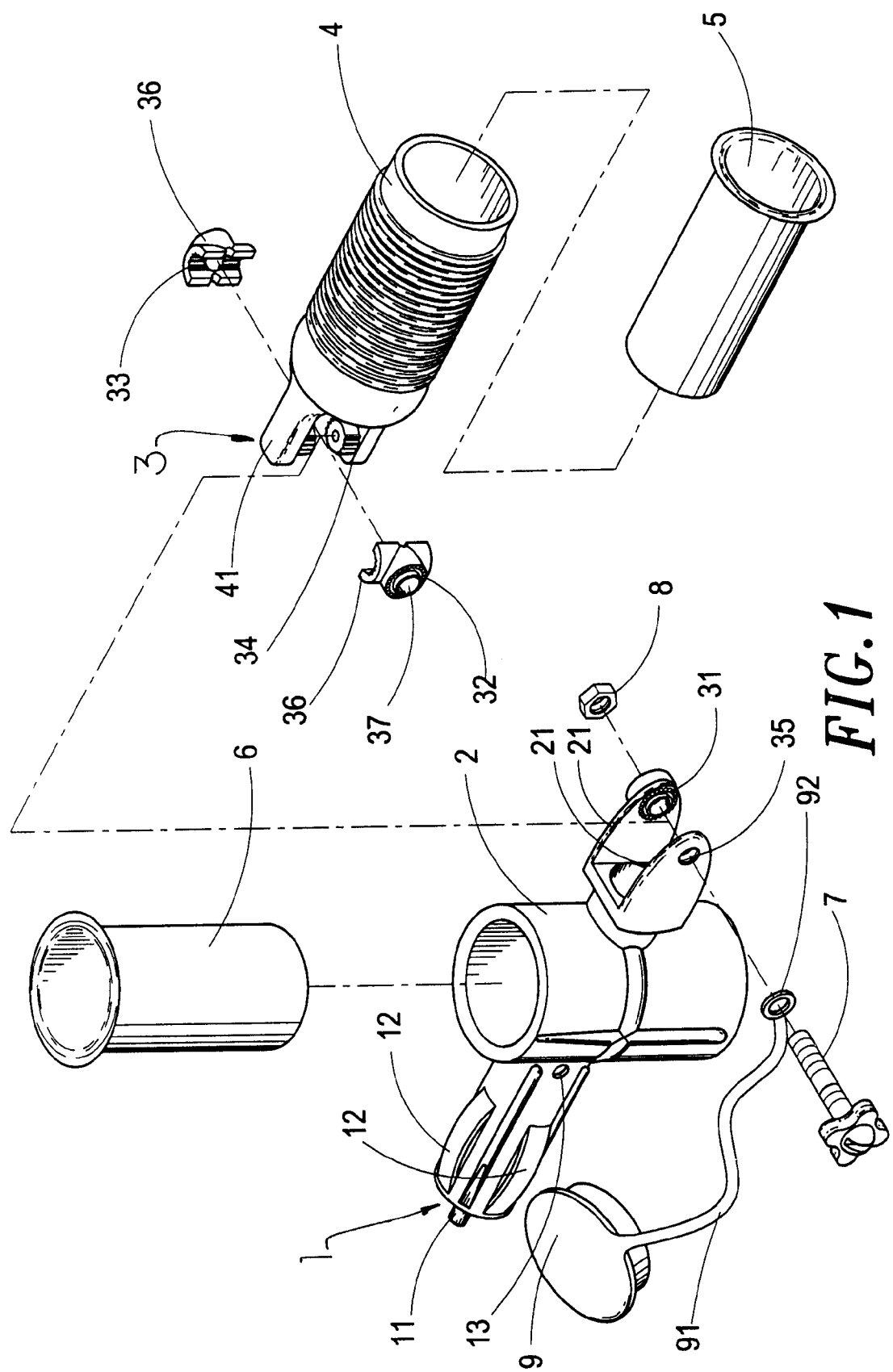
FIG. 1 is an exploded perspective view of the extending cigar-lighting seat according to the present invention.
Figure 2:
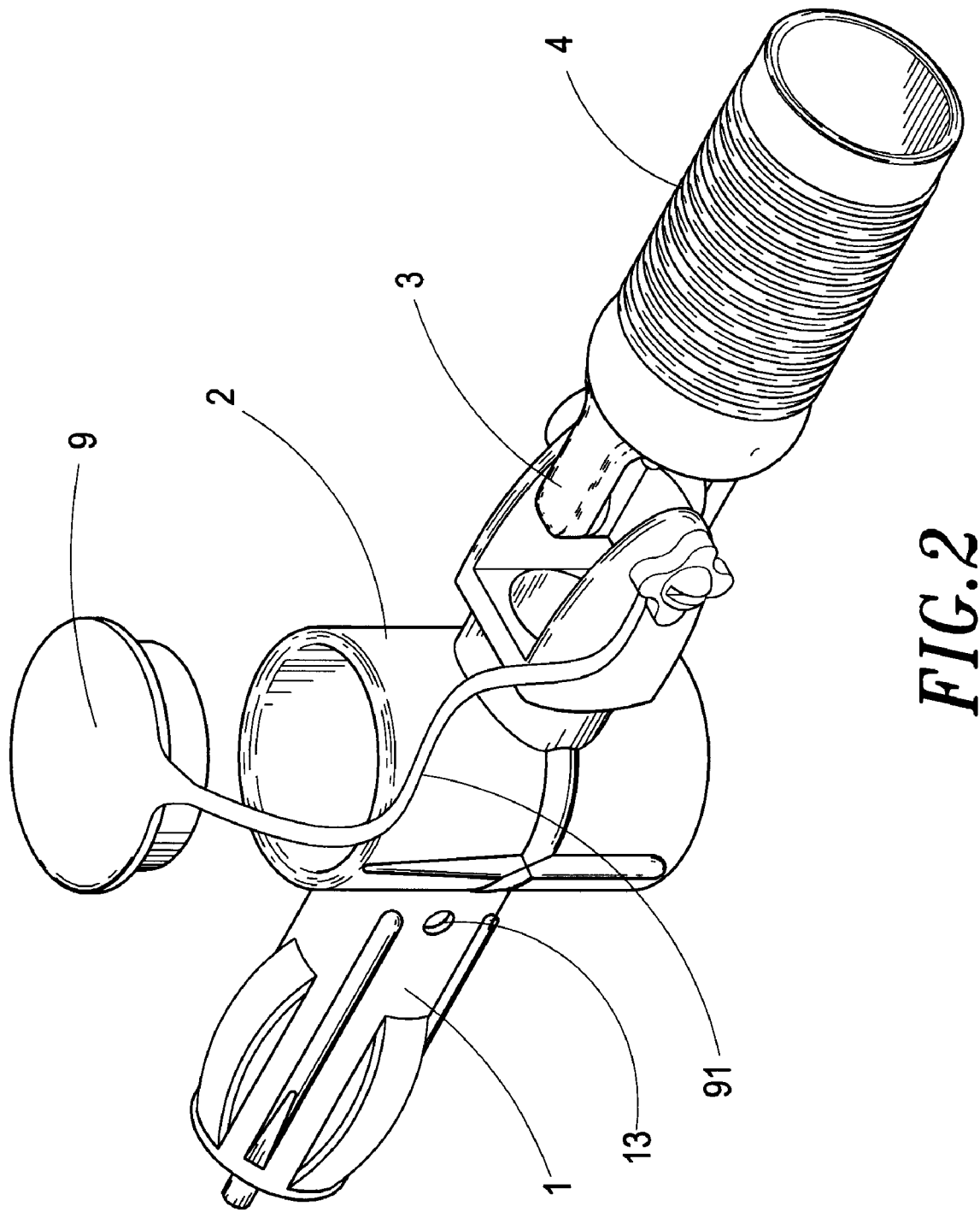
FIG. 2 is an assembled view of the extending cigar-lighting seat according to the present invention.

Referring to FIGS. 1 and 2, the extending cigar-lighting seat of the present invention comprises an inserting member 1, a first extending member 2, a second extending member 4 and a universal connector 3. The inserting member 1 has an electric plug 11 having a plurality of metal elastic pieces 12 formed at the periphery of the inserting member 1. Thereby, as it is inserted into the cigar-lighting socket of a car, it supplies power. A LED 13 is input at a side near the driver for illustrating power is transferred. A rear side of the inserting member 1 is connected with the hollow first extending portion 2. The first extending member 2 is perpendicular to the inserting member 1. A metal cylindrical conductor 6 is placed within the first extending member 2 to electrically conduct with the inserting member 1 for transferring electrical power. A connecting end of the first extending member 2 has a pair of holding plates 21. Each holding plate 21 has a round hole 35, wherein an inner periphery of each of the round holes has an annular flange gear 31 provided thereon. The second extending member 4 is a hollow cylinder and a metal made cylindrical conductor is placed to electrically connect with the inserting member therein for transferring electrical power. Other circuit appliances can be used as the second extending member 4, such as a fan, a mobile phone seat, etc. The connecting end of the second extending member 4 has a pair of supporting posts 41, wherein an inner side of each of the posts 41 has a plurality of buckling teeth 34. The universal connector 3 comprises the annular flange teeth 31 at the connecting end of the first extending member 2, and a cover 36 having a groove 32 thereon and buckling teeth 33 therein. The buckling teeth 34 are provided on the connecting end of the second extending member 4. A stud 7 passes through a round hole 37 of the cover. The operation of the universal connector 3 is controlled by the tightness of the stud 7. Right and left rotations of the universal connector 3 is controlled by the buckling teeth 33 of the cover 36 and the buckling teeth 34 of the second extending member 4, while the upper and lower sliding of the universal connector 3 is controlled by the annular flange teeth 31 and the groove 32 of the cover 36. The stud 7 is sued to match a screw 8 for securing the universal connector 3. Therefore, the second extending member 4 may move in the up, down, right and left directions. It can be used by drivers or passengers. In the present invention, a cap 9 which has a strip soft rubber 9 thereaside is connected to an annular body 92. The annular body 92 is passed by the stud 7 and is affixed to the connecting end of the first extending member 2. When the first or the second extending member 2, 4 is not used by an electric device, this cap 9 can be used for preventing dust or other object from entering.

Figure 5:
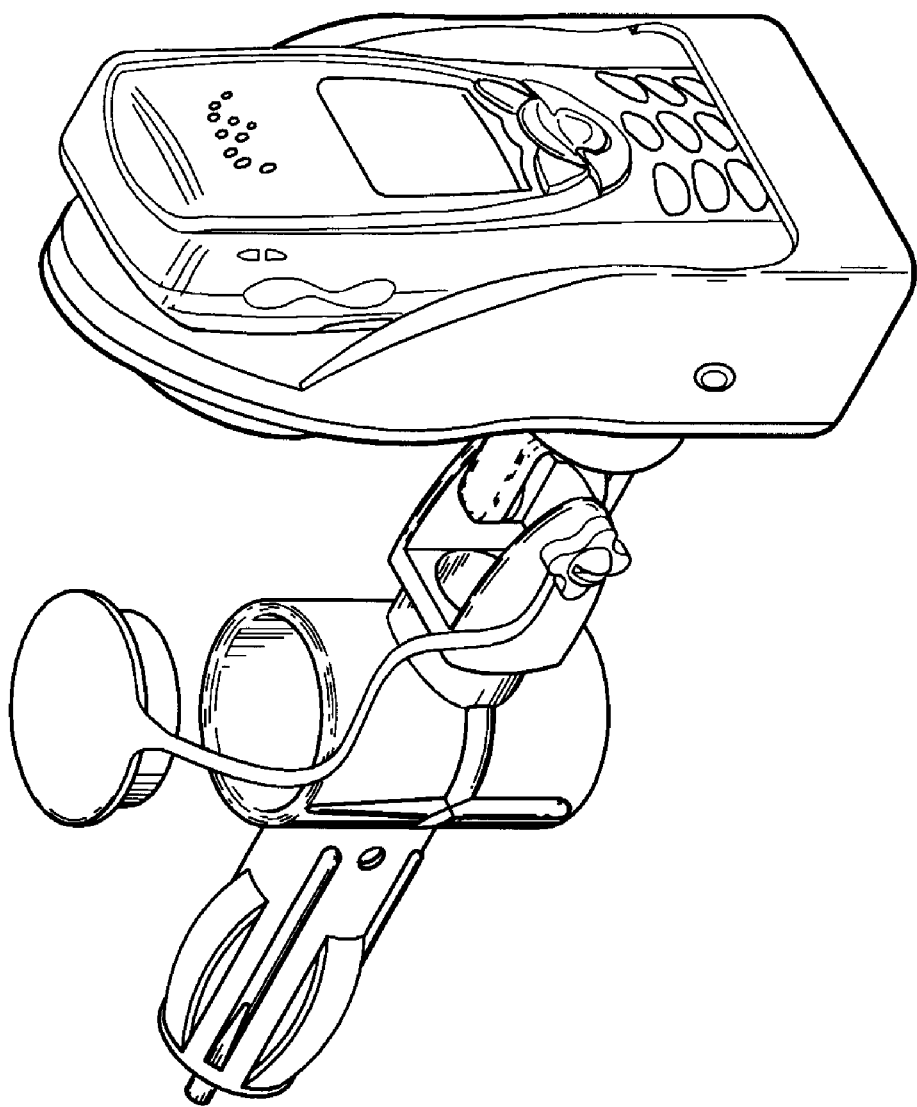
FIG. 5 is a modified embodiment of the second extending portion in the structure of the extending cigar-lighting seat.
Figure 6:
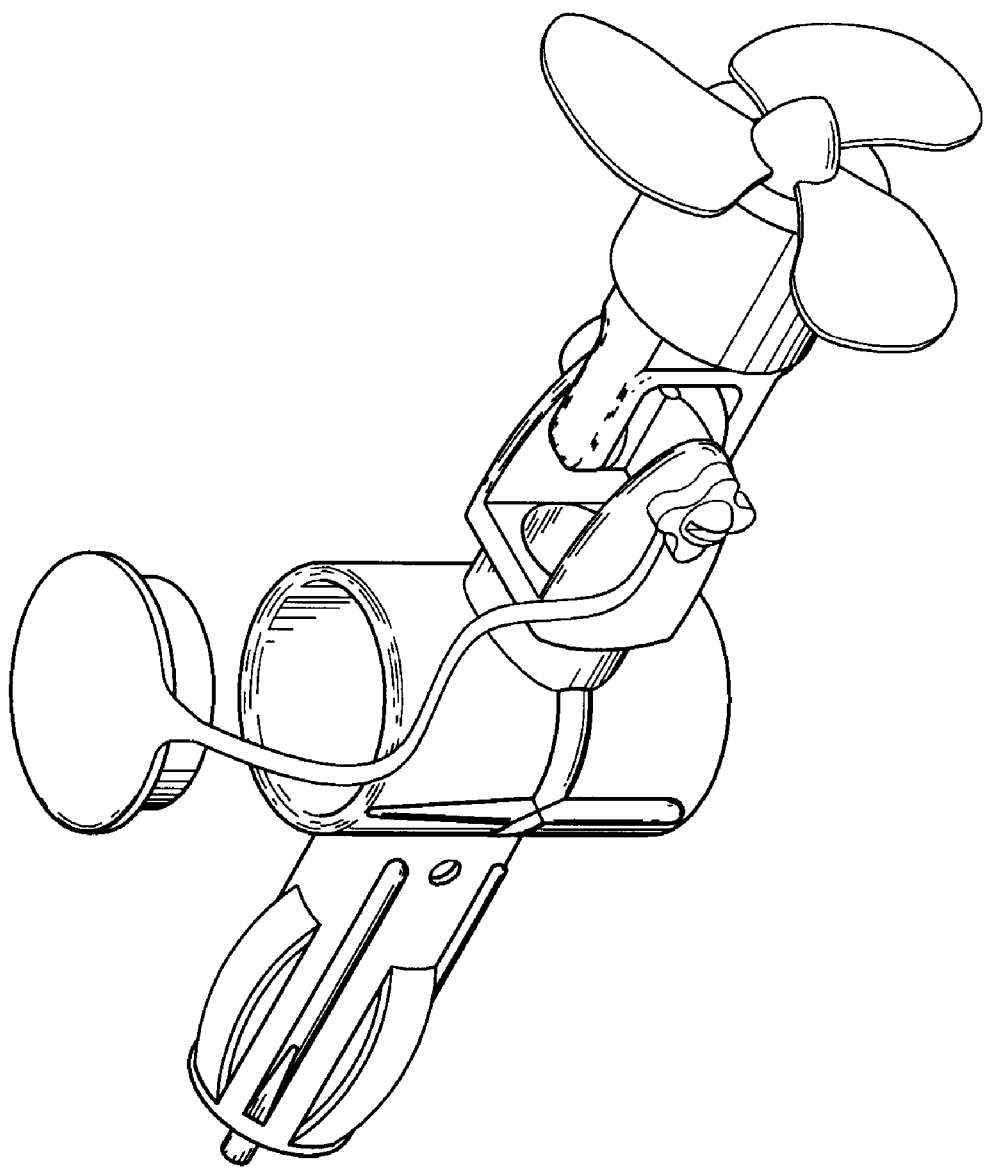
FIG. 6 is another modified embodiment of the second extending portion in the structure of the extending cigar-lighting seat.

Referring to FIG. 2, an assembled perspective view of the extending cigar-lighting seat according to the present invention is illustrated. The inserting member 1 is arranged for inserting into the car cigar-lighting socket. The first extending member 2 is behind the inserting member 1 for being inserted by the electric device. The universal connector 3 is connected to the second extending member 4. The extending member 4 not only can be inserted by compatible electric devices, but also may move up, down, right, and left, so that the driver and passenger may use it effectively. Besides, the second extending member 4 may be replaced as desired. Referring to FIGS. 5 and 6. the second extending member 4 may be an extending body with universal connectors at two ends for being connected to a third extending member so as to extend the length.

Figure 3:
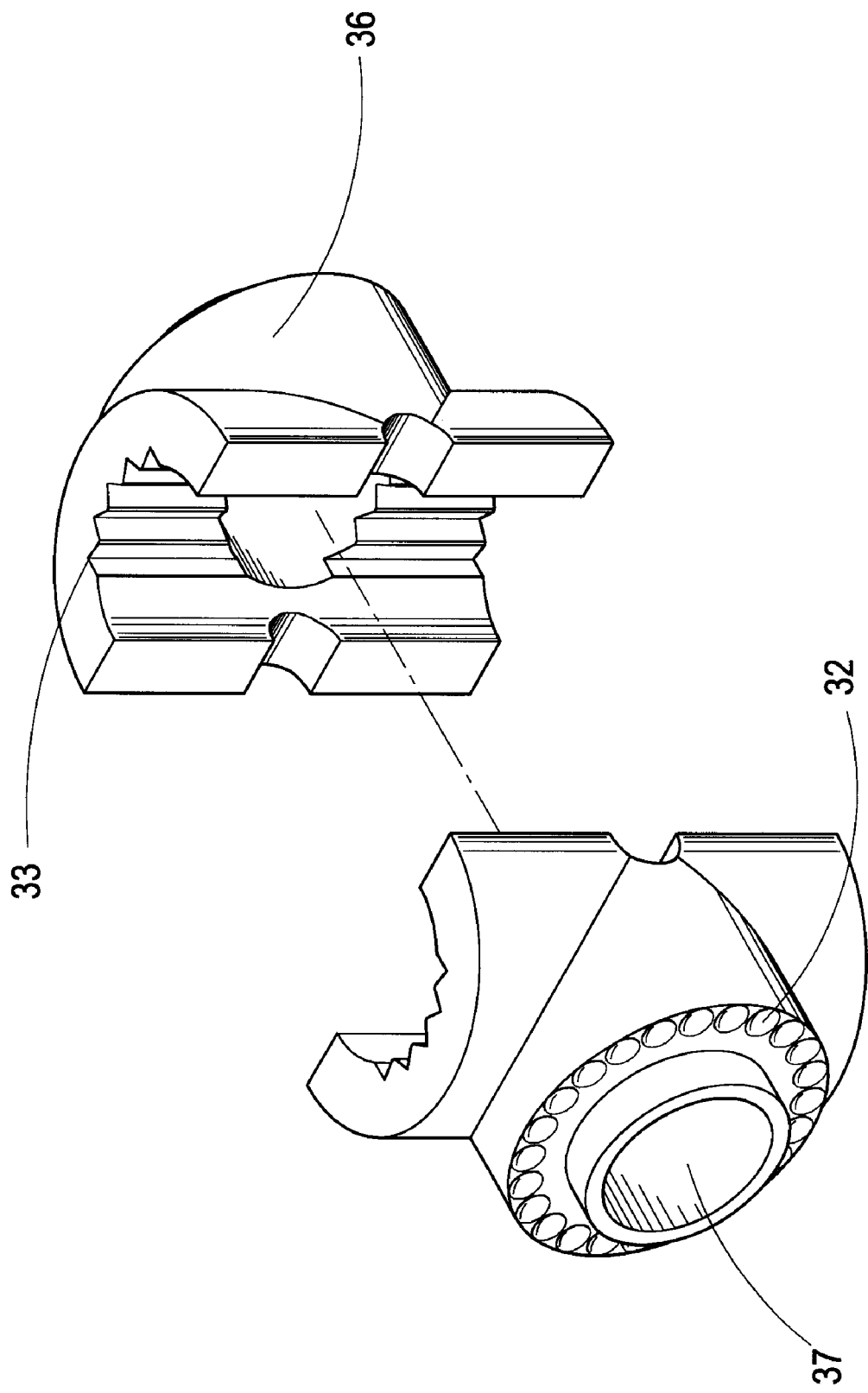
FIG. 3 is an exploded perspective view of the cover of the extending cigar-lighting seat according to the present invention.

Referring to FIG. 3, an exploded perspective view of the cover is illustrated. The annular groove 32 of the cover 36 is capable of being embedded with the annular flange gear. The buckling teeth 33 are provided at the inner side of the cover 36, which are engaged with the buckling teeth of the second extending member 4. The round hole 37 or the cover 36 is arranged for being inserted by a stud 7. By the structure of the cover 36 and the connection of the first extending member 2 and the second extending member 4, the universal connector is capable of moving up, down, right and left.

Figure 4:
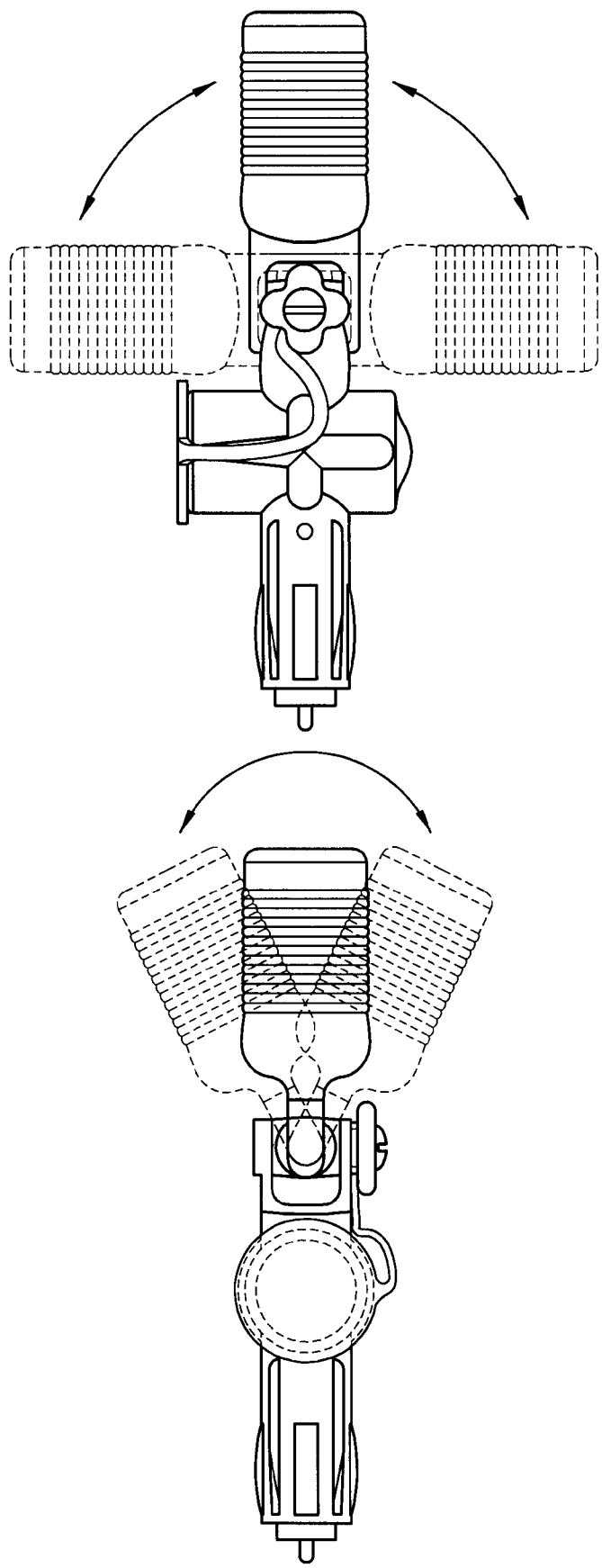
FIG. 4A shows one embodiment that the extending cigar-lighting seat of the present invention rotates rightwards and leftwards.
FIG. 4B shows one embodiment that the extending cigar-lighting seat of the present invention rotates upwards and downwards.

Referring to FIG. 4A, an embodiment of rotating up, down, right, and left of the present invention is illustrated. By the rotating direction of the extending portion of the universal connector 3, it can be adjusted to a preferred position.

As comparing with the prior art, the extending cigar-lighting seat of the present invention has the following advantages.

1. The present invention can be used conveniently that the driver can take care it in driving, while the driver is unnecessary to move the body or move the eyesight, so that the occurrence of accident can be reduced accordingly.

2. The seat of connector can be updated as desired, other reducing the manufacturing cost, a variety of modifications can be performed.

3. Outer side of each universal connector is connected with a stud. When a heavy object is supported by the seat, the stud serves to adjust the engaging depth so that each extending joint is firmly secured when the consumed products can be extended out.

4. A plurality of extending cigar-lighting seat of the present invention can be connected in series for extending the length and increasing the number of the extending cigar-lighting seat used.

The present invention is thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. An extending cigar-lighting seat, comprising:

an inserting member having an electric plug at one end thereof for transferring electric power;

a first extending member perpendicularly connected to another end of said inserting member, wherein said first extending member is a hollow body having a cylindrical electrical conductor placed therein and a connecting end;

a second extending member having a connection end; and a universal connector for connecting said first extending member to said connection end of said second extending member, wherein said universal connector comprises:

a pair of holding plates connected to said connecting end of said first extending member, wherein each of said holding plates has a round hole and an inner periphery of each of said round holes has an annular flange gear provided thereon;

a pair of supporting posts connected to said connection end of said second extending member, wherein an inner side of each of said supporting posts has buckling teeth;

a cover connected between said first extending member and said second extending member, wherein said cover has a round hole coaxially aligned with said round holes of said holding plates of said first extending member, a groove provided around each end of said round hole, and buckling teeth provided therein to engage with said buckling teeth of said supporting posts of said second extending member;

a stud passing through said round hole of said cover and said round holes of said two holding plates of said first extending member; and a nut securing to a free end of said stud to secure said universal connector so as to connect said first and second extending members together while said annular flange teeth are equipped with each said groove for controlling an upper and lower sliding of said universal connector, wherein an operation of said universal connector is controlled by a tightness of said stud with respect to said nut while right and left rotations of said universal connector is controlled by said buckling teeth of said cover and said buckling teeth of said second extending member, thereby said second extending member is capable of moving in up, down, right, and left directions; and means for electrically connecting said electric plug with said electrical conductor through said connecting end of said first extending member and said connection end of said second extending member.

2. An extending cigar-lighting seat, as recited in claim 1, wherein said second extending member is a hollow body having a cylindrical electrical conductor placed therein and electrically connected with said connection end thereof.

3. An extending cigar-lighting seat, as recited in claim 1, wherein said second extending member is a sear of a hand-free seat for a mobile phone.

4. An extending cigar-lighting seat, as recited in claim 1, wherein said second extending member is an electric product electrically connected to said connection end thereof.

5. An extending cigar-lighting seat, as recited in claim 1, wherein said second extending member is an extending body for connecting another extending member so as to extend a length of said extending cigar-lighting seat.

6. An extending cigar-lighting seat, as recited in claim 1, further comprising a cap which has a strip soft rubber thereaside connecting to an annular body which is passed by said stud and is affixed to said connecting end of said first extending member.

7. An extending cigar-lighting seat, as recited in claim 6, wherein said second extending member is a hollow body having a cylindrical electrical conductor placed therein and electrically connected with said connection end thereof.

8. An extending cigar-lighting seat, as recited in claim 6, wherein said second extending member is a sear of a hand-free seat for a mobile phone.

9. An extending cigar-lighting seat, as recited in claim 6, wherein said second extending member is an electric product electrically connected to said connection end thereof.

10. An extending cigar-lighting seat, as recited in claim 6, wherein said second extending member is an extending body for connecting another extending member so as to extend a length of said extending cigar-lighting seat.

\* \* \* \* \*